(12) United States Patent
Björnhov et al.

(10) Patent No.: US 10,400,803 B2
(45) Date of Patent: Sep. 3, 2019

(54) FRICTION CONNECTING MEANS (71) Applicant: Corebon AB, Arlöv (SE)

(72) Inventors: Tobias Björnhov, Falsterbo (SE);
Rasmus Olsson, Göteborg (SE); Adam Nilsson, Lund (SE)

(73) Assignee: COREBON AB, Arlov (SE)

( * ) Notice: Subject to any disclaimer, the term of this patent is extended or adjusted under 35 U.S.C. 154(b) by 234 days.

(21) Appl. No.: 15/125,551

(22) PCT Filed: Mar. 11, 2015

(86) PCT No.: PCT/EP2015/055098
§ 371 (c)(1),
(2) Date: Sep. 12, 2016

(87) PCT Pub. No.: WO2015/136002
PCT Pub. Date: Sep. 17, 2015

(65) Prior Publication Data
US 2017/0002848 A1    Jan. 5, 2017

(30) Foreign Application Priority Data
Mar. 11, 2014 (SE) ..................................... 1450275

(51) Int. Cl.
*F16B 1/00* (2006.01)
*F16D 1/08* (2006.01)

(52) U.S. Cl.
CPC ............ *F16B 1/005* (2013.01); *F16D 1/0805* (2013.01)

(58) Field of Classification Search
CPC ... B23B 31/305; B23B 31/403; B23B 31/204; Y10T 279/1021; Y10T 279/1024; Y10T 279/1029; Y10T 279/12; Y10T 279/1216; E02B 17/0845; F16B 4/002; F16D 1/08; F16D 1/0805; F16D 1/0852; F16D 1/087; B25B 5/065
See application file for complete search history.

(56) References Cited

U.S. PATENT DOCUMENTS

| | | | | |
|---|---|---|---|---|
| 2,621,867 A | * | 12/1952 | Grettve | B65H 75/243 242/571.1 |
| 2,826,420 A | * | 3/1958 | Klingler | B23B 31/16287 117/911 |
| 3,023,995 A | * | 3/1962 | Hopkins | F16L 17/10 192/85.13 |
| 3,422,505 A | * | 1/1969 | Slemmons | E02B 17/0845 188/67 |
| 3,542,354 A | * | 11/1970 | Fitzpatrick | B23B 31/305 269/22 |
| 3,677,559 A | * | 7/1972 | Andre | B23B 31/305 279/4.03 |
| 4,052,861 A | | 10/1977 | Malone et al. | |

(Continued)

FOREIGN PATENT DOCUMENTS

| | | |
|---|---|---|
| DE | 1 575 230 A1 | 11/1969 |
| DE | 1 929 659 A1 | 12/1969 |

(Continued)

*Primary Examiner* — Jonathan P Masinick
(74) *Attorney, Agent, or Firm* — Lowe Graham Jones PLLC (57) ABSTRACT

A friction connecting means includes a receiving element and engagement elements. The receiving element has a pressure pocket provided with a carbon fiber composite material layer.

11 Claims, 8 Drawing Sheets

(56) References Cited

U.S. PATENT DOCUMENTS

| | | | | |
|---|---|---|---|---|
| 4,264,229 | A * | 4/1981 | Falk | F16D 1/0805 |
| | | | | 192/85.13 |
| 4,362,411 | A | 12/1982 | Åsberg | |
| 4,410,210 | A * | 10/1983 | de Sivry | B23B 31/305 |
| | | | | 294/102.1 |
| 4,687,189 | A * | 8/1987 | Stoll | B25B 5/065 |
| | | | | 269/22 |
| 4,774,872 | A * | 10/1988 | Creedon | F41B 6/00 |
| | | | | 138/153 |
| 4,968,184 | A * | 11/1990 | Reid | E02B 17/0008 |
| | | | | 405/195.1 |
| 4,989,909 | A * | 2/1991 | Bouligny, Jr. | B25B 5/065 |
| | | | | 188/67 |
| 5,051,018 | A * | 9/1991 | Appell | F16D 1/0805 |
| | | | | 403/5 |
| 5,197,542 | A * | 3/1993 | Coone | E21B 33/1208 |
| | | | | 166/122 |
| 5,743,677 | A * | 4/1998 | Phillips | E02B 17/0008 |
| | | | | 405/199 |
| 6,179,530 | B1 * | 1/2001 | Retzbach | B23B 31/305 |
| | | | | 279/2.08 |
| 6,488,323 | B1 * | 12/2002 | Bouligny | B66C 1/46 |
| | | | | 269/22 |
| 6,907,652 | B1 * | 6/2005 | Heijnen | B21D 39/042 |
| | | | | 166/207 |
| 7,331,583 | B1 | 2/2008 | Andre | |
| 7,793,567 | B2 * | 9/2010 | Kato | B23Q 1/287 |
| | | | | 303/89 |
| 8,800,997 | B1 * | 8/2014 | Smith | B23B 31/202 |
| | | | | 269/48.1 |
| 8,944,438 | B2 * | 2/2015 | Andre | B23B 31/204 |
| | | | | 279/2.08 |
| 2004/0050004 | A1 * | 3/2004 | McCann | E04B 1/41 |
| | | | | 52/404.2 |
| 2004/0262855 | A1 | 12/2004 | Andre | |
| 2016/0333923 | A1 * | 11/2016 | Bjornhov | F16C 11/0685 |

FOREIGN PATENT DOCUMENTS

| | | |
|---|---|---|
| DE | 1 947 567 A1 | 3/1970 |
| EP | 0 637 694 A1 | 2/1995 |
| GB | 2 097 300 A | 11/1982 |
| JP | 57-94131 A | 6/1982 |
| JP | 2-2907979 A | 11/1990 |
| JP | 5-500336 A | 1/1993 |
| JP | 3149456 A | 3/2009 |
| SE | 425120 B | 8/1982 |
| SE | 511085 C2 | 8/1999 |
| SE | 525667 C2 | 3/2005 |
| SE | 528419 C2 | 11/2006 |
| SE | 530550 C2 | 7/2008 |

\* cited by examiner

FRICTION CONNECTING MEANS

PRIORITY CLAIM

This invention claims priority from PCT Application Serial No. PCT/EP2015/055098 filed Mar. 11, 2015, which claims priority to European Application Serial No. 1450275-1 filed Mar. 11, 2014, which are hereby incorporated by reference.

TECHNICAL FIELD

The present invention relates to friction connecting means, e.g. for connecting two elements, and more specifically to a friction connecting means comprising composite material.

BACKGROUND

Friction couplings of different types are today well known and widely used. One example of a friction coupling is disclosed in U.S. Pat. No. 4,362,411 which shows a one-sided friction coupling arranged to press a first element towards a second element by means of a pressure medium. The pressure medium is arranged to be pressed into several pockets, which are provided separate from each other in a wall of a bore of the first element, by means of a piston. When the pressure medium is pressed into the pocket, an element provided in the pocket is displaced radially, pressing the formable inner wall of the bore in towards the second element, thereby creating a friction coupling. A drawback with this known friction coupling is that it is difficult to provide an even distribution of the pressure medium and thereby to provide an even pressure along the entire first and second element which may result in a warped friction coupling causing undesired wear.

Other known friction couplings use techniques like gluing and clenching when elements of the friction coupling are about to be joined together. A major disadvantage with these techniques is that they do not achieve the desired rigidity or strength-weight ratio. Also, if using clenches the element has to have a recess to receive the clench which may change and deteriorate the properties of the material.

In many other designs the joining between composite materials is the weakest link in the construction and one possible reason for this is that the materials used today, e.g. steel, are heavy causing the joining to break.

SUMMARY

An object of the present invention is to provide improvements over prior art. This object is achieved by a technique defined in the appended independent claims; certain embodiments being set forth in the related dependent claims.

In a first aspect of the invention, a receiving element of a friction connecting means, which comprises the receiving element and an engagement element, is provided. The receiving element is arranged to secure the position of the engagement element to the receiving element by means of friction, wherein the receiving element comprises at least one pressure pocket with at least one pressurizing space which is arranged to contain a pressure medium, at least one first carbon fiber composite material layer at least partly arranged on one side of the pressure pocket and wherein the layer is configured to expand in a direction away from the pressure pocket under a predetermined pressure from the pressure pocket, creating a friction engagement between the receiving element and the engagement element. This friction coupling is beneficial since it enables engagement of elements without changing their features or adding unnecessary weight, and at the same time keeping the desired rigidity and durability of the connected elements.

In one embodiment, the carbon fiber composite material layer is arranged to at least partly surround the pressure pocket. This carbon fiber composite material forms the friction coupling when the coupling arrangement is activated.

Preferably, the pressure pocket in an idle state has a circular or oval cross section expanding radially when the pressure is increased forcing the carbon fiber composite material layer to expand radially. With a circular or oval cross section that is not rigid; the pressure pocket and its associated receiving element can be inserted into or slipped onto the corresponding engagement element.

The receiving element may further comprise at least one second carbon fiber composite material layer at least partly arranged on the opposite side of the pressure pocket with respect to the first carbon fiber composite material layer, wherein the first layer and/or the second layer is/are configured to expand in a direction away from the pressure pocket under a predetermined pressure, creating the friction engagement between the receiving element and the engagement element. This carbon fiber composite material forms the friction coupling when the coupling arrangement is activated.

In a preferred embodiment, the first carbon fiber composite material layer and the second carbon fiber composite material layer are connected in an integral body. Together they form the friction coupling when the coupling arrangement is activated.

A carbon fiber composite material wrapping may be arranged on one side of the first carbon fiber composite material layer or on one side of the second carbon fiber composite material layer. The wrapping is beneficial in that it directs the force from the pressure pocket in a desired direction.

In one embodiment the pressure medium is a hydraulic fluid.

In another embodiment, the pressure medium is a plastic material in liquid form which is solidified at a predetermined pressure, creating a permanent state.

The receiving element may further comprise pressure means arranged to pressurize the pressure pocket by pressing the pressure medium into the pressure pocket.

Preferably, the carbon fiber composite material used for the first and second layer has a braided texture. An advantage with the braided structure is to direct the force from the pressure pocket only to certain parts of the structure.

In one embodiment the pressure pocket comprises a plastic material.

In a second aspect of the invention, a friction connecting means is provided, comprising a receiving element and at least one engagement element which is at least partly surrounded by or enclosed in the receiving element.

In one embodiment the engagement element is a second receiving element, wherein the pressurization of the pressure pocket and thereby the expansion of the first and/or the second layer of the first and second receiving element takes place simultaneously. This is beneficial in that it forms two friction couplings in the same friction connecting means.

In a third aspect of the invention, a method for assembling a receiving element is provided, comprising the steps of providing at least one pressure pocket having at least one pressurizing space, at least partly arranging at least one first carbon fiber composite material layer on one side of the pressure pocket and providing pressure means in connection to the pressure pocket in order to pressurize the pressure pocket by forcing or pushing a pressure medium into the pressure pocket.

In a fourth aspect of the invention, a method for assembling a receiving element is provided, comprising the steps of providing at least one pressure pocket having at least one pressurizing space, at least partly arranging at least one first carbon fiber composite material layer on one side of the pressure pocket, providing pressure means in connection to the pressure pocket in order to pressurize the pressure pocket by feeding or pushing a pressure medium into the pressure pocket and at least partly arranging at least one second carbon fiber composite material layer on the opposite side of the pressure pocket.

In an aspect of the invention, a friction connecting means is provided comprising a carbon fiber composite material.

In a further aspect of the invention, there is provided a two-component assembly in which a first component is partially received in a recess of the second component and in which at least the interface or engagement area between the components comprises a carbon fiber composite material provided on either of the components or on both components.

BRIEF DESCRIPTION OF THE DRAWINGS

Embodiments of the invention will be described in the following, reference being made to the appended drawings which illustrate non-limiting examples of how the inventive concept can be reduced into practice.

DETAILED DESCRIPTION OF EMBODIMENTS

Hereinafter, certain embodiments will be described more fully with reference to the accompanying drawings. The invention may, however, be embodied in many different forms and should not be construed as limited to the embodiments set forth herein; rather, these embodiments are provided by way of example so that this disclosure will be thorough and complete, and will fully convey the scope of the invention, such as it is defined in the appended claims, to those skilled in the art.

Figure 2:
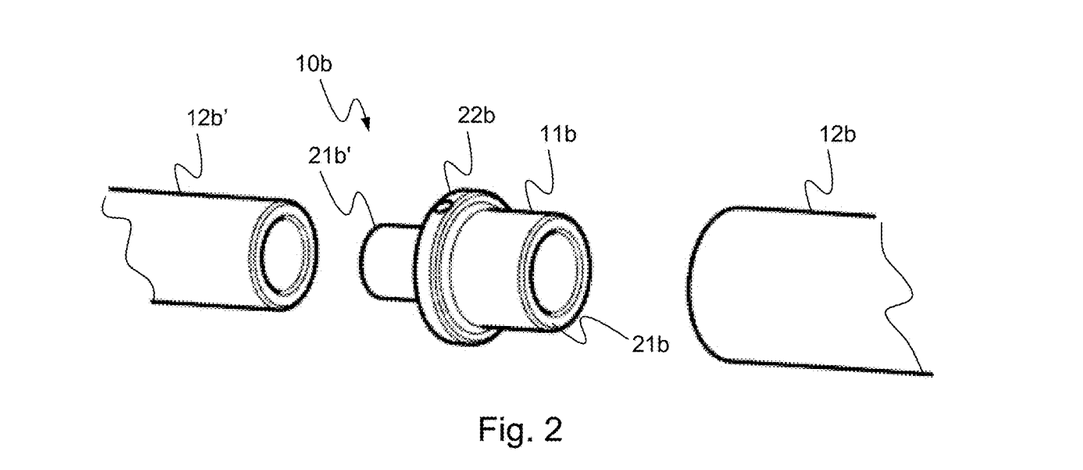
FIG. 2 shows a friction connecting means according to a second embodiment of the invention.
Figure 3:
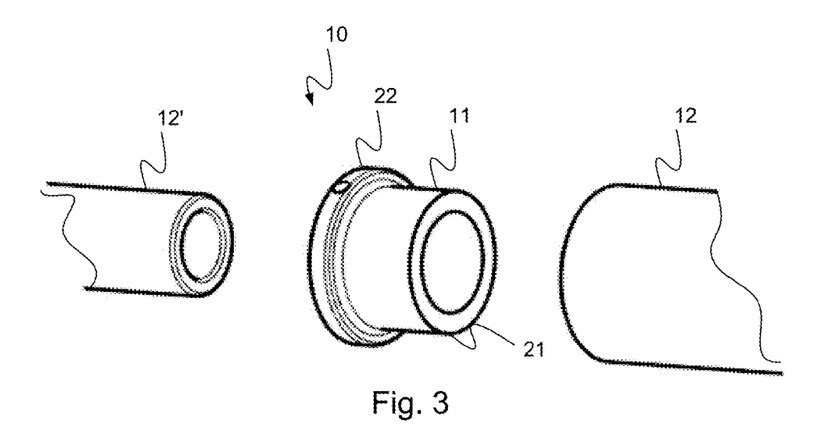
FIG. 3 shows a friction connecting means according to a third embodiment of the invention.
Figure 4:
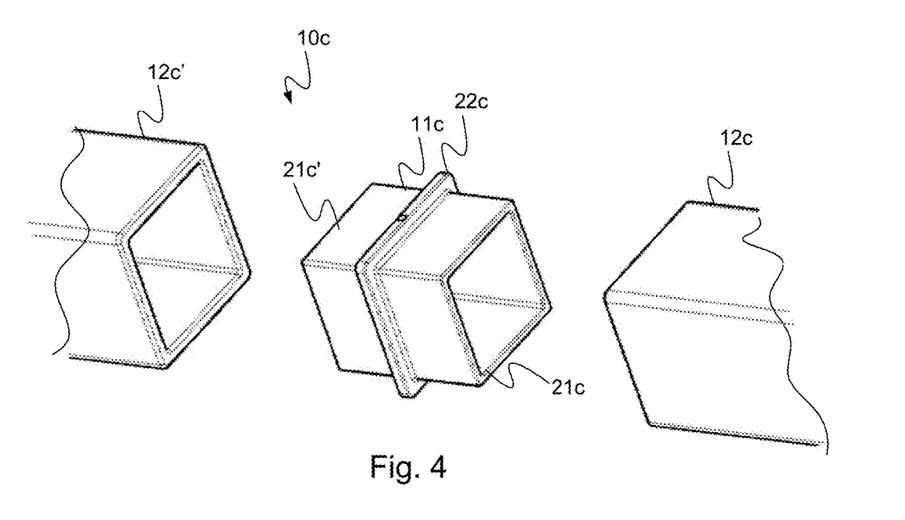
FIG. 4 shows a friction connecting means according to a fourth embodiment of the invention.

The present disclosure relates to a friction connecting means, or a friction coupling, which is configured to connect at least two objects, e.g. pipes or beams, as are shown in FIGS. 1-4, or any other element that would benefit from a friction coupling. The friction coupling 10, 10a, 10b, 10c comprises three tubular elements, two of which are engagement elements 12, 12a, 12a', 12b, 12c e.g. a pipe or a beam, and the third is a receiving element 11, 11a, 11b, 11c, i.e. the active part in the coupling procedure. The receiving element 11, 11a, 11b, 11c has two annular sockets 21, 21', 21a, 21a', 21b, 21b' configured to receive the respective end portion of the tubular engagement elements. In FIG. 4 the socket 21c, 21c' is square. Hence, the receiving element is designed to—by means of friction—engage the engagement element 12, 12a, 12b, 12c and thus creating a strong connection between the two elements. The receiving element 11, 11b, 11c shown in FIGS. 2-4 has a peripheral flange 22, 22b, 22c which defines an inner space to be described further below.

The two elements of the friction coupling 10, 10a, 10b, 10c are made of composite material or a carbon fiber composite material, and this material makes it possible to connect both composite materials such as glass fiber or carbon fiber, and non-composite material such as steel. The material enables engagement of elements without changing their features or adding unnecessary weight, and at the same time keeping the desired rigidity and durability of the connected elements. The use of carbon fiber composite material provides the friction coupling 10, 10a, 10b, 10c with a very low weight compared to the friction couplings known today, without affecting other necessary features of the friction coupling.

Figure 1:
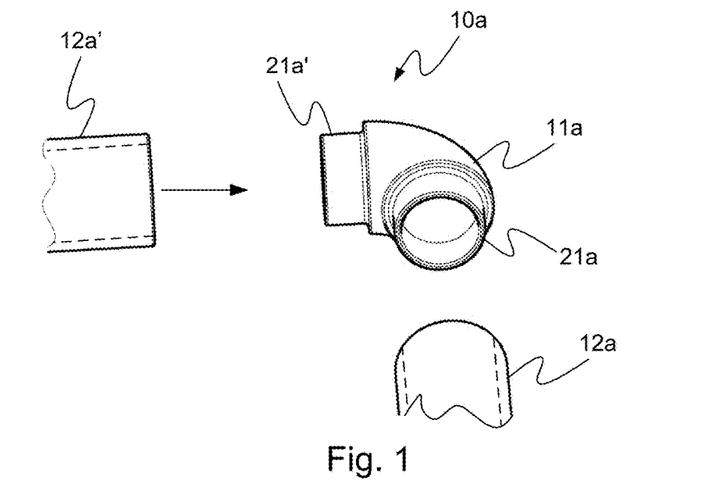
FIG. 1 shows a friction connecting means according to a first embodiment of the invention.
Figures 1A, 2A, 3A:
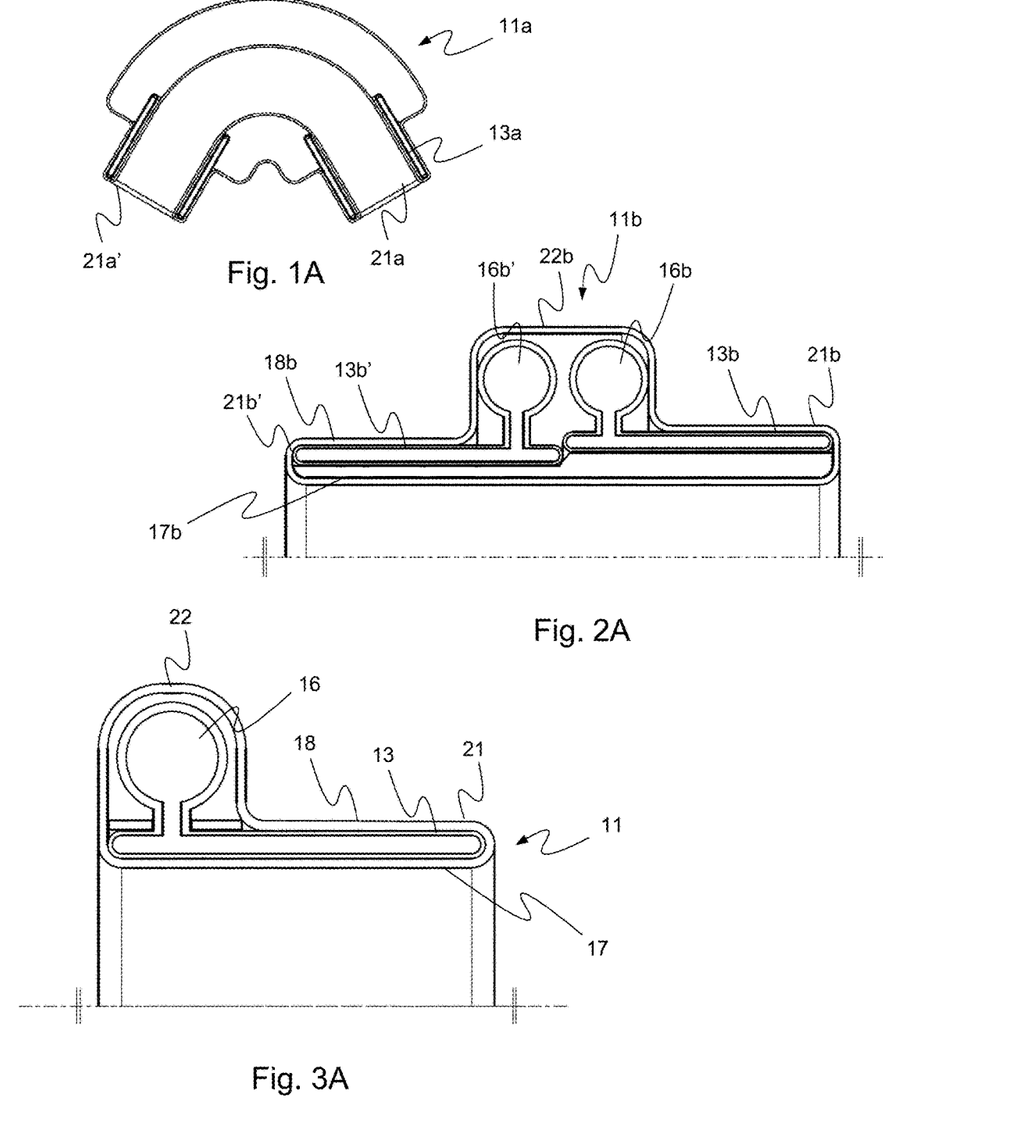
FIG. 1A shows a cross section of the friction connecting means in FIG. 1.
FIG. 2A shows a cross section of the friction connecting means in FIG. 2.
FIG. 3A shows a cross section of the friction connecting means in FIG. 3.

In FIG. 1A the same receiving part 11a as in FIG. 1 is shown, but in cross section. The pressure pocket 13a is also shown.

In FIG. 2A the same friction connecting means 11b as in FIG. 2 is shown in cross section. This friction connecting means 11b is double, i.e. it comprises two pressure pockets 13b, 13b' directed in opposite directions and two pressurizing spaces 16b, 16b'. This forms two friction couplings in the same friction coupling means 11b. Also shown in the figure are a first carbon fiber composite material layer 17b and a second carbon fiber composite material layer 18b which are the means that form the strong friction coupling. These layers 17b, 18b will be explained in more detail later.

Figure 5:
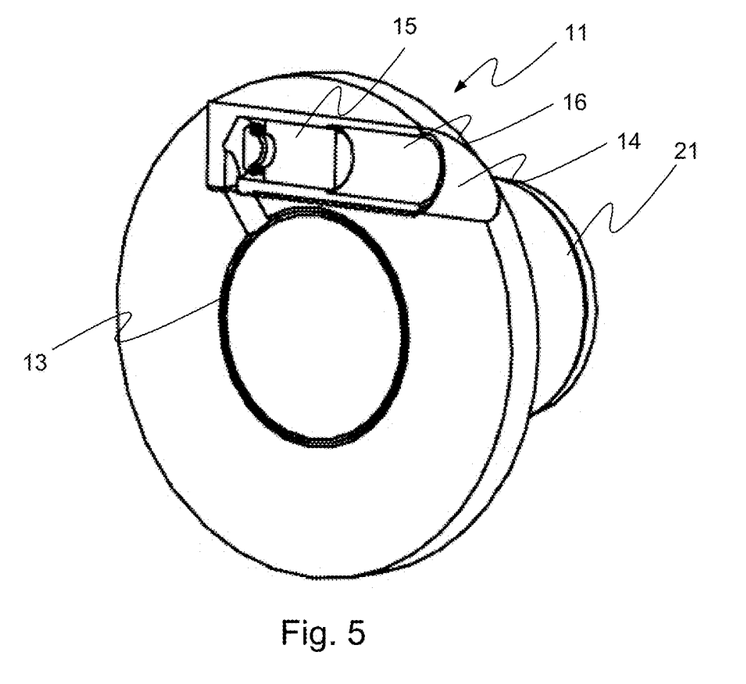
FIG. 5 is a perspective view of a receiving element in FIG. 3.
Figure 6:
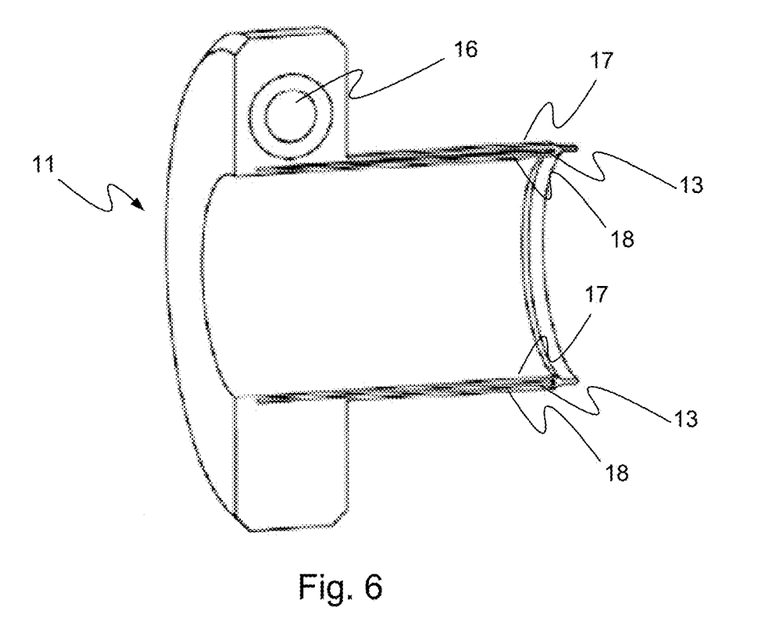
FIG. 6 shows a cross section of the receiving element in FIG. 3.
Figure 7:
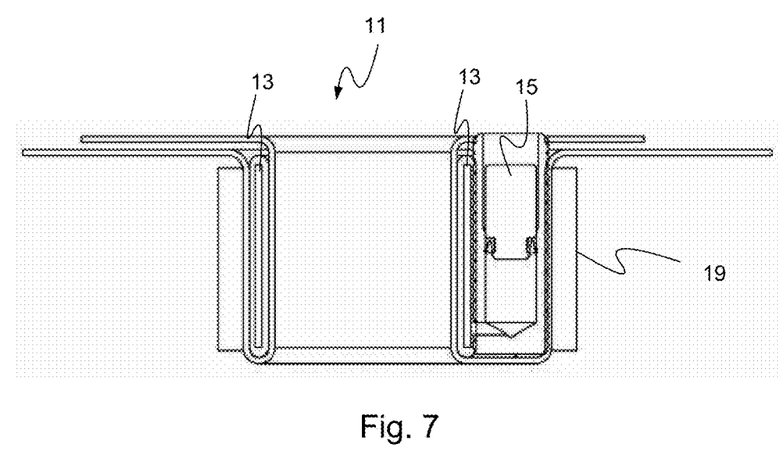
FIG. 7 is a cross section of a receiving element of FIG. 8.

In FIG. 3A the same friction connecting means 11 as in FIG. 3 is shown in cross section. The friction connecting means 11 comprises a pressurizing space 16, a pressure pocket 13, a first carbon fiber composite material layer 17 and a second carbon fiber composite material layer 18. All of these parts will be thoroughly explained later in this application. In FIGS. 5-7 different views and cross sections of the receiving element 11 of the friction connecting means in FIG. 3 are shown. The receiving element 11 is provided with a socket 21, pressure means 14 and a pressure pocket 13. Within the pressure means 14 a pressurizing space 16 is provided which comprises a pressure medium and a piston 15. The pressure pocket 13 comprises an elastic bag, which for instance can be made of plastics material, and the pressure medium is a plastic material in liquid form. As an alternative, the pressure medium comprises a hydraulic fluid. The pressure medium, in the shape of a plastic material, is in an idle state of the friction connecting means 10 in liquid form, but at a predetermined pressure it is solidified.

The receiving element 11 further comprises a first carbon fiber composite material layer 17 which is arranged on one side of the pressure pocket 13. A second carbon fiber composite material layer 18 may in one embodiment be arranged at least partly on the opposite side of the pressure pocket 13 with respect to the first carbon fiber composite material layer 17. This second layer 18 is, as well as the first composite material layer 17, configured to expand in a direction away from the pressure pocket 13 at a certain pressure, and thus attaining a friction engagement between the receiving 11 and the engagement 12 element.

When the pressure means 14 provides pressure, the piston 15 moves in the pressurizing space 16 compressing the pressure medium which is solidified. Pressure is thus provided to the pressure pocket 13 which is filled with e.g. hydraulic fluid and expands. The pressure pocket 13 presses on the first 17 and/or second 18 composite layer which is configured to expand in a direction away from the pressure pocket 13, and against the engagement element 12. When this happens a permanent state is achieved and a strong friction connection between the receiving 11 and the engagement 12 element is attained.

The first and second carbon fiber composite material layers 17, 18 are designed with a braided structure. This is obtained by placing the fibers in specific directions which allows certain parts of the friction coupling 10 to expand in certain predefined directions. Other parts of the coupling 10, not comprising the braided fiber structure, are thus not affected by the expansion. The force from the pressure pocket 13 may be directed by means of a wrapping 19 arranged either on one side of the first carbon fiber composite material layer 17 or on one side of the second carbon fiber composite material layer 18, as is shown in FIG. 7. In this figure the first layer 17 forms the friction coupling 10 by being pressed against the engagement element 12 and the wrapping 19 acts as reinforcement, preventing the pressure pocket 13 to expand in the direction of the wrapping 19.

Since the pressure pocket 13 expands uniformly, pressure will be obtained on both sides of the pocket 13. In a first embodiment, no wrapping 19 is arranged providing a double coupling. In a second embodiment a wrapping 19 is provided on an outer side of the pressure pocket 13. The force from the expanded pressure pocket 13 will thus be directed inwards, forming an inner coupling. In a third embodiment the wrapping 19 is provided on an inner side of the pressure pocket 13. The force will thus be directed outwards, forming an outer coupling.

Figure 8:
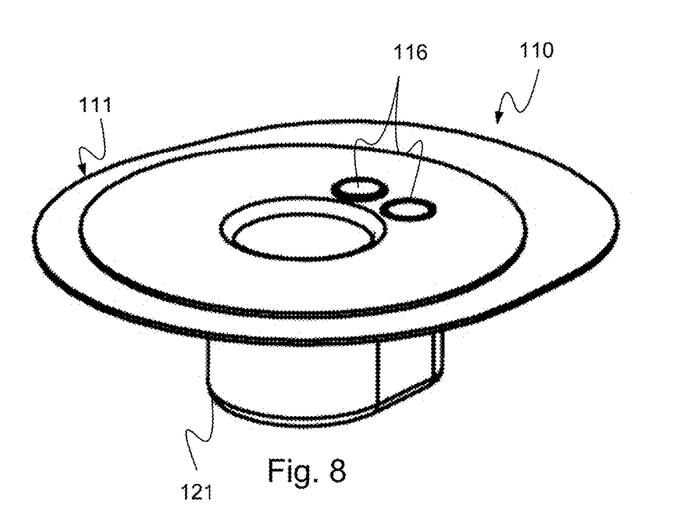
FIG. 8 shows the receiving element of FIG. 7 belonging to a fifth embodiment of the invention.

A receiving element 111 of the friction connecting means 110 according to one embodiment of the invention is shown in FIG. 8. This friction connecting means 110 comprises a socket 121 to be inserted into an engagement element and it works in the same way as the one described in connection with FIGS. 5-7, but the pressure means 114 connections are arranged coaxially with the coupling 110. This is beneficial when a friction coupling 110 integrated in a flat surface is desired.

Figure 9:
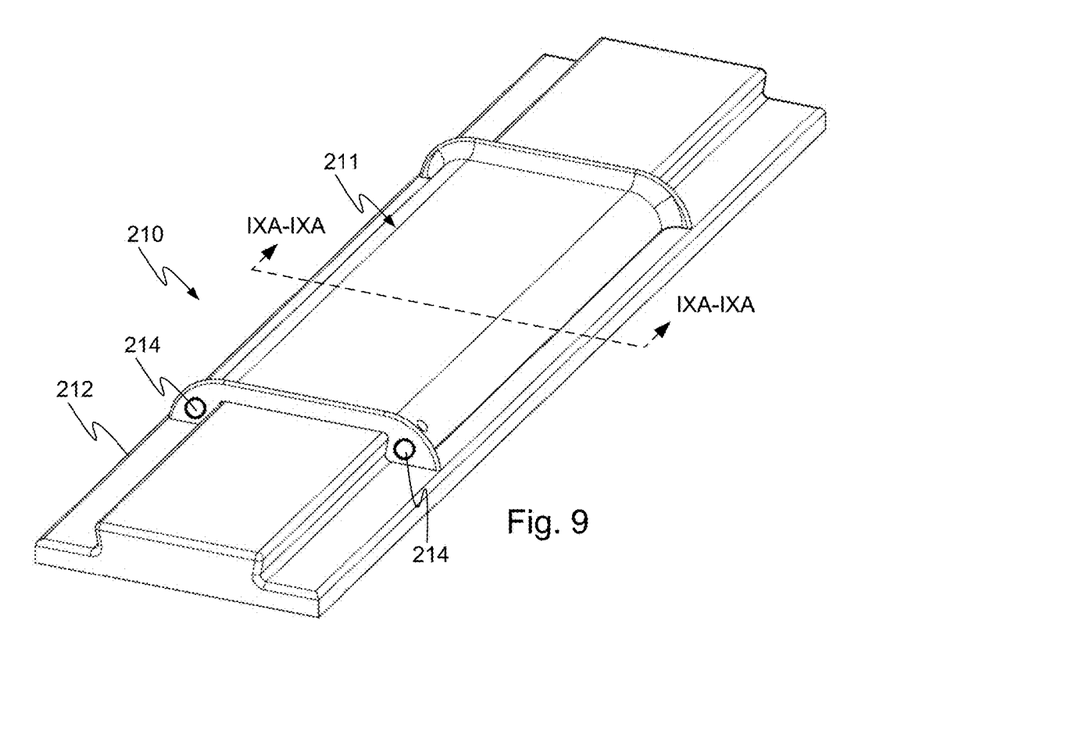
FIG. 9 shows a friction connecting means according to a sixth embodiment of the invention.
Figure 9A:
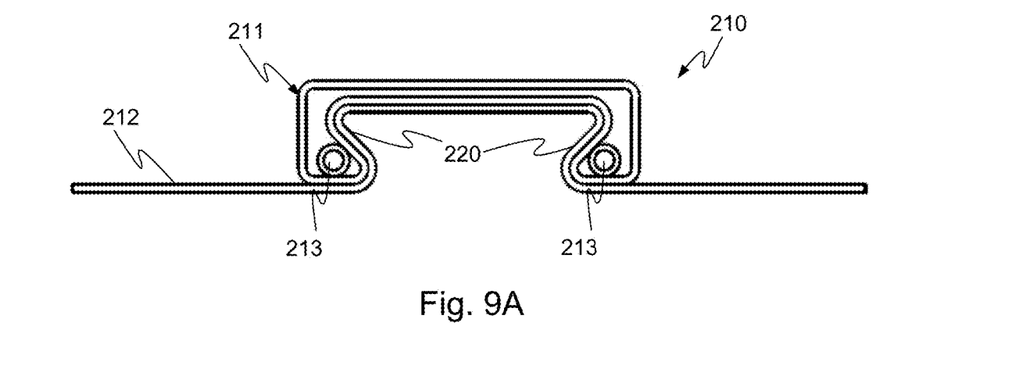
FIG. 9A is a cross section taken along line IXA-IXA in FIG. 9.

Yet another friction connecting means 210 is shown in FIGS. 9 and 9A. The cross section in FIG. 9A is taken along the line IXA-IXA in FIG. 9. The general idea of this embodiment is the same as in the earlier described friction connecting means. But, in this embodiment the receiving element 211 is slid or snapped onto the engagement element 212 when the pressure pocket 213 is uninflated. When pressure is provided by the pressure means 214 the pressure pocket 213 inflates and exerts a pressure onto an inner wall 220 of the element 211, locking the receiving element 211 against the engagement element 212 in all directions.

Figure 10:
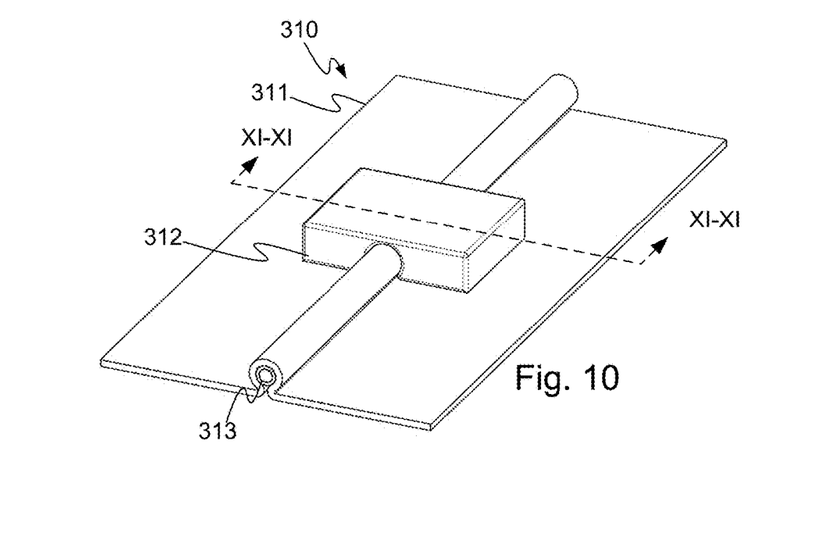
FIG. 10 shows a friction connecting means according to a seventh embodiment of the invention.
Figure 11:
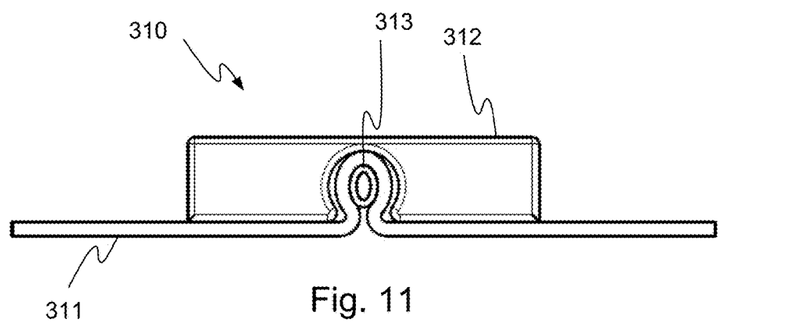
FIG. 11 is a cross section taken along line XI-XI in FIG. 10.
Figure 12:
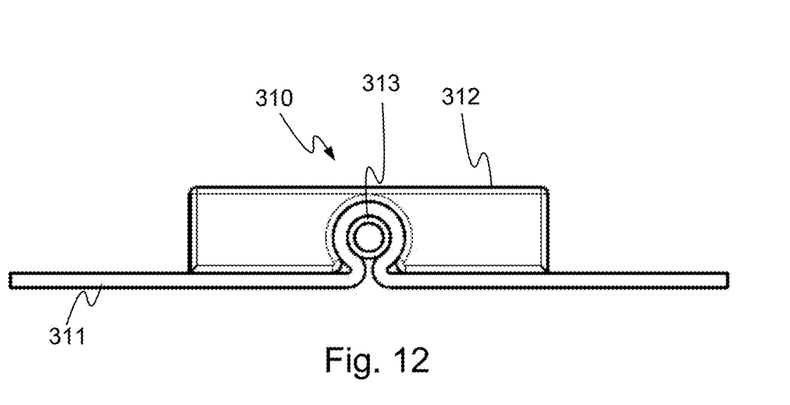
FIG. 12 shows the friction connecting means in FIG. 10 in an engaged state.

In FIGS. 10-12 a friction coupling 310 according to one embodiment is shown. FIG. 11 is a cross section taken along line XI-XI in FIG. 10, as is FIG. 12;

This coupling 310 engages two flat surfaces 311, 312 with each other. This friction connecting means 310 comprises, just like the previously described, a pressure pocket 313, but in this embodiment it comprises a plastic tube rather than a plastic bag. When the pressure pocket 313 is uninflated, the receiving part 311 may be inserted into the engagement part 312. This is shown in FIG. 11. When pressure is applied from the pressure means 314, the pressure pocket 313 expands and presses onto the receiving element 311 which fills out the cavity of the engagement element 312 forming a friction connection. The receiving element 311 and the engagement element 312 are thus locked together by the friction coupling. This expanded state of the pressure pocket 313 and the locked together receiving element 311 and engagement element 312 are shown in FIG. 12.

Figure 13:
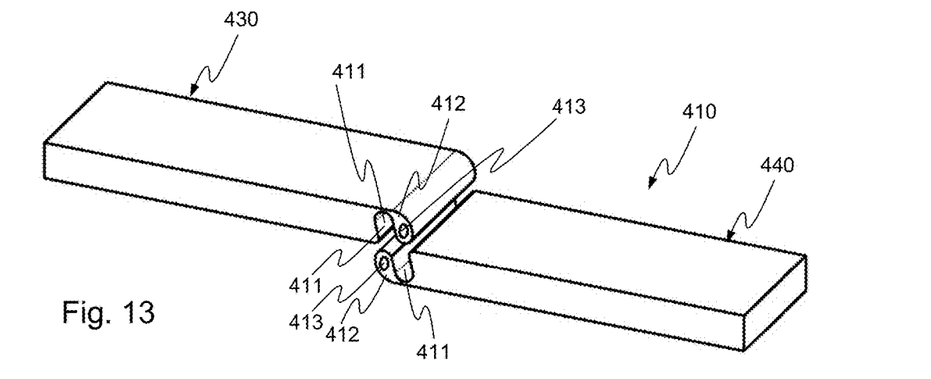
FIG. 13 shows a friction connecting means according to an eighth embodiment of the invention in a disengaged state.
Figure 14:
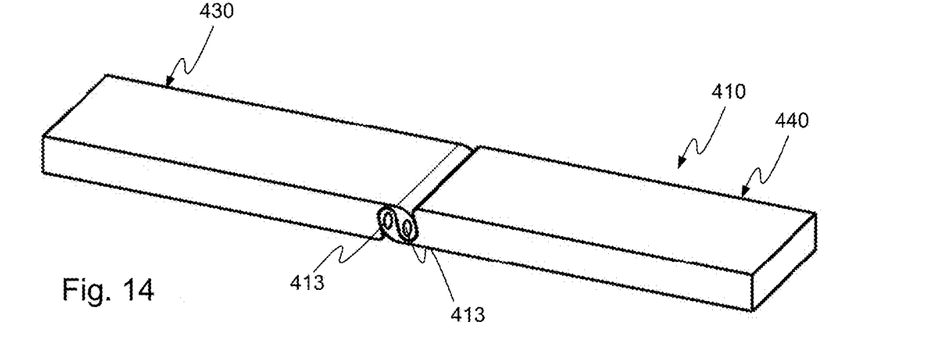
FIG. 14 shows the friction connecting means in FIG. 13 in a connected but disengaged state.
Figure 15:
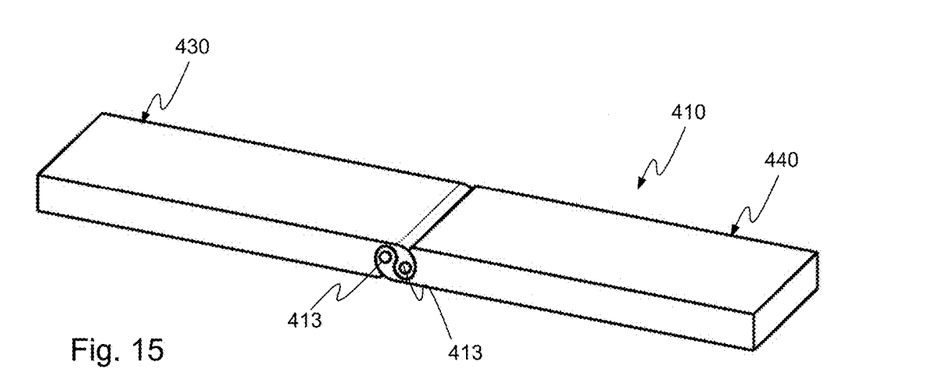
FIG. 15 shows the friction connecting means in FIG. 13 in an engaged state.

Another type of friction connecting means 410 is shown in FIGS. 13-15. The principle of this embodiment is similar to the one described in connection with FIGS. 10-12, with a plastic tube as pressure pocket 413. In this embodiment both parts 430, 440 works as receiving 411 and engagement 412 elements, respectively. Both elements 411, 412 comprise a pressure pocket 413 and both elements 411, 412 comprise a cavity for the opposite element 412, 411 to be received in. In FIG. 13 the friction connecting means 410 are in an unconnected state, separated from each other. In FIG. 14 the friction connecting means 410 are connected to each other, but disengaged, i.e. pressure is not yet applied. In FIG. 15 the pressure medium has been pressurized, the pressure pockets 413 have expanded, which in turn have expanded the respective receiving elements 411. Thus, a strong connection between the friction connecting means 410 in all directions is obtained. This embodiment is not limited to one layer of friction connecting means 410, an assembly of friction connecting means 410 arranged on top of each other may be provided, providing extra stability to the coupling and making sure that the resulting piece is plane.

An advantage of using carbon fiber composite material is that the fiber may be placed in specific directions, which enables a design of expandable parts of the friction coupling where the expandable parts are allowed to expand in specific directions and thereby preventing other parts, or directions of the friction coupling from being affected by the expansion.

The friction connecting means comprises a pressure space with a pressure pocket which is arranged to, under pressure from a pressure medium, press on an expandable part of the receiving element where the expandable part engages the engagement element creating the strong connection. The pressure pocket may be designed as an elastic bag made of a plastic material.

In one aspect, the friction connecting means comprises a receiving element of the type described above and at least one engagement element which is arranged to be at least partly surrounded by or enclosed in the receiving element.

The friction coupling may also be used integrated in another composite element which then may be connected to another element.

In one aspect, the receiving element of a friction connecting means which comprises the receiving element and an engagement element, wherein the receiving element is configured to secure the position of the engagement element to the receiving element by means of friction, wherein the receiving element comprises a pressure pocket with a pressurizing space which is configured to contain a pressure medium and a carbon fiber composite material layer partly arranged on one side of the pressure pocket. The composite layer is configured to expand in a direction away from the pressure pocket under a predetermined pressure from the pressure pocket, forming a friction engagement between the receiving element and the engagement element.

It should be appreciated that the inventive concept is not limited to the embodiments described herein; many modifications are feasible within the scope of the invention set forth in the appended claims. For instance, the friction coupling may be used integrated in another composite element which then may be connected to another element.

The invention claimed is:

1. A receiving element of a friction connecting means which comprises the receiving element and an engagement element, wherein the receiving element is arranged to secure the position of the engagement element to the receiving element by means of friction, wherein the receiving element comprises:
    at least one pressure pocket comprising an elastic bag, and having at least one pressurizing space which is arranged to contain a pressure medium;
    at least one first carbon fiber composite material layer at least partly arranged on one side of the pressure pocket and arranged to at least partly surround the pressure pocket; and
    at least one second carbon fiber composite material layer at least partly arranged on the opposite side of the pressure pocket with respect to the first carbon fiber composite material layer,
    wherein said first layer and said second layer are connected in an integral body;
    wherein said first layer and/or said second layer is/are is configured to expand in a direction away from the pressure pocket under a predetermined pressure from the pressure pocket, creating a friction engagement between the receiving element and the engagement element.

2. The receiving element according to claim 1, wherein the pressure pocket in an idle state has a circular or oval cross section expanding radially when the pressure is increased forcing said first layer to expand radially.

3. The receiving element according to claim 1, wherein a carbon fiber composite material wrapping is arranged on one side of the first carbon fiber composite material layer or on one side of the second carbon fiber composite material layer.

4. The receiving element according to claim 1, wherein the pressure medium is a hydraulic fluid.

5. The receiving element according to claim 1, wherein the pressure medium is a plastic material in liquid form which is solidified at a predetermined pressure, creating a permanent state.

6. The receiving element according to claim 1, wherein the receiving element further comprises pressure means arranged to pressurize the pressure pocket by pressing the pressure medium into the pressure pocket.

7. The receiving element according to claim 1, wherein the carbon fiber composite material used for the first and second layer has a braided texture.

8. The receiving element according to claim 1, wherein said at least one pressure pocket comprises a plastic material.

9. A friction connecting means, comprising:
    a receiving element having at least one pressure pocket comprising an elastic bag, and having at least one pressurizing space which is arranged to contain a pressure medium; and
    at least one first carbon fiber composite material layer at least partly arranged on one side of the pressure pocket and arranged to at least partly surround the pressure pocket;
    at least one second carbon fiber composite material layer at least partly arranged on the opposite side of the pressure pocket with respect to the first carbon fiber composite material layer, wherein said first layer and said second layer are connected in an integral body; and
    wherein said first layer and/or said second layer is/are configured to expand in a direction away from the pressure pocket under a predetermined pressure from the pressure pocket, creating a friction engagement between the receiving element and the engagement element; and
    at least one engagement element which is at least partly surrounded by or enclosed in the receiving element.

10. The friction connecting means according to claim 9, wherein the engagement element is a second receiving element, wherein the pressurization of the pressure pocket and thereby the expansion of the first and/or the second layer of the first and second receiving element take place simultaneously.

11. A method for assembling a receiving element of a friction connection means that includes the receiving element and an engagement element, wherein the receiving element is arranged to secure the position of the engagement element to the receiving element by means of friction, comprising the steps of:
    providing at least one pressure pocket comprising an elastic bag, and having at least one pressurizing space;
    at least partly arranging at least one first carbon fiber composite material layer on one side of the pressure pocket;
    providing pressure means in connection to the pressure pocket in order to pressurize the pressure pocket by pushing a pressure medium into the pressure pocket; and
    wherein said layer is configured to expand in a direction away from the pressure pocket under a predetermined pressure from the pressure pocket, creating a friction engagement between the receiving element and the engagement element;
    at least partly arranging at least one second carbon fiber composite material layer on the opposite side of the pressure pocket;
    connecting said first layer and said second layer in an integral body.

* * * * *